United States Patent [19]

Angelis et al.

[11] Patent Number: 4,845,414

[45] Date of Patent: Jul. 4, 1989

[54] METHOD OF PROTECTING THE ELECTRIC DRIVE OF A VEHICLE AGAINST OVERLOAD

[75] Inventors: Jürgen Angelis; Hartmut Scherf, both of Mannheim; Helmut Haase, Laudenbach, all of Fed. Rep. of Germany

[73] Assignee: BBC Brown, Boveri Aktiengesellschaft, Mannheim, Fed. Rep. of Germany

[21] Appl. No.: 120,121

[22] Filed: Nov. 13, 1987

[30] Foreign Application Priority Data

Nov. 14, 1986 [DE] Fed. Rep. of Germany ....... 3638946

[51] Int. Cl.$^4$ ............................................. H02P 7/00
[52] U.S. Cl. ..................................... 318/434; 318/139
[58] Field of Search ............... 318/139, 434; 364/426, 364/431.07

[56] References Cited

U.S. PATENT DOCUMENTS

| 3,243,681 | 3/1966 | Dannettell | 318/139 |
| 3,551,773 | 12/1970 | Dannettell et al. | 318/416 X |
| 3,944,899 | 3/1976 | Wright | 318/139 X |
| 4,423,362 | 12/1983 | Konard et al. | 318/139 |

FOREIGN PATENT DOCUMENTS

| 0184339 | 6/1986 | European Pat. Off. | |
| 52-5111 | 1/1977 | Japan | 318/139 |
| 59-95616 | 6/1984 | Japan | 364/426 |

Primary Examiner—Bentsu Ro
Attorney, Agent, or Firm—Herbert L. Lerner; Laurence A. Greenberg

[57] ABSTRACT

A method for protecting the electric drive of a vehicle against overload when the nominal power is temporarily exceeded includes measuring the traveling speed of the vehicle. The traveling speed is automatically limited for preventing a continuous speed obtained at nominal operation of the electric drive corresponding to traveling resistances independent of acceleration, from being exceeded.

11 Claims, 4 Drawing Sheets

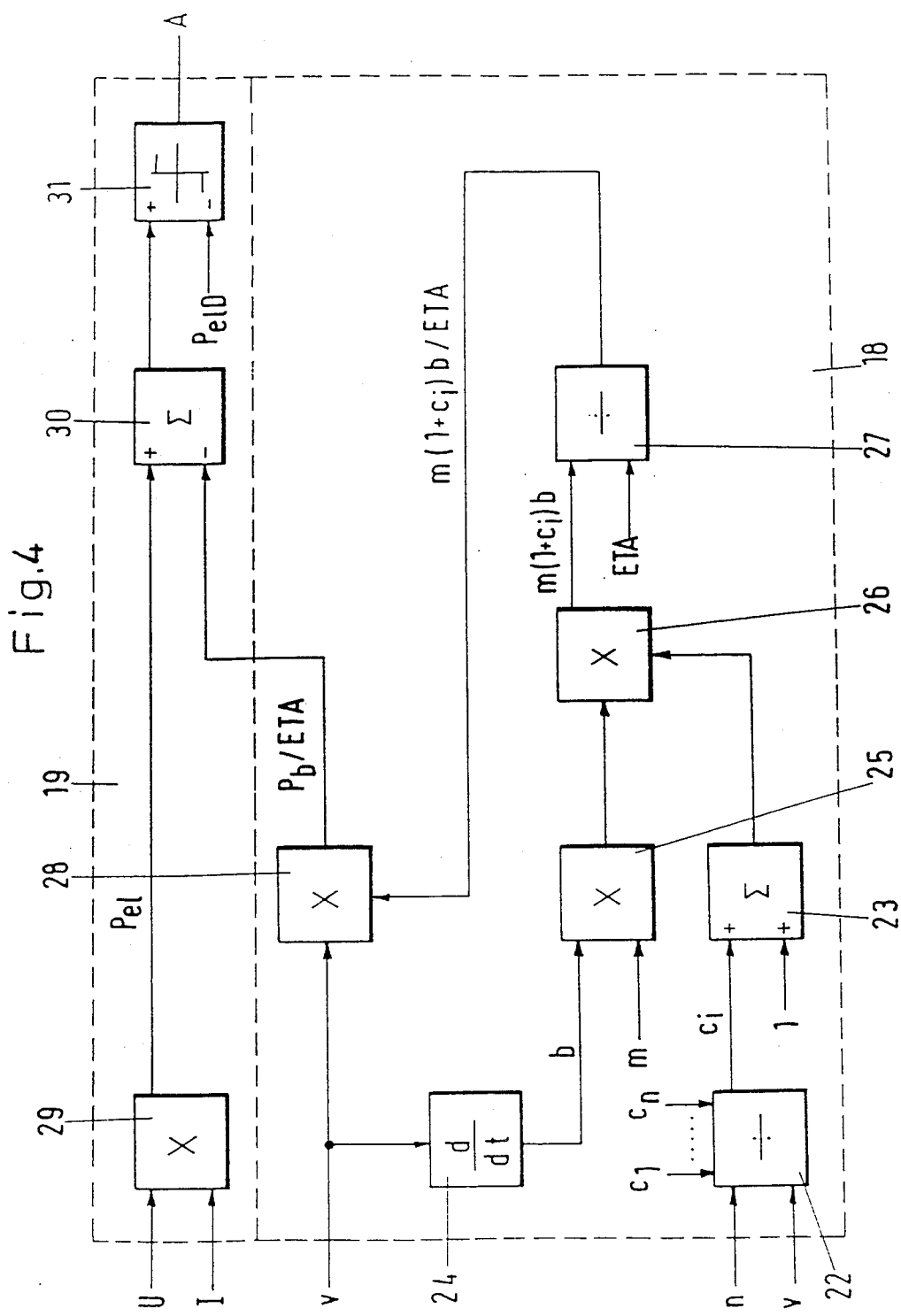

METHOD OF PROTECTING THE ELECTRIC DRIVE OF A VEHICLE AGAINST OVERLOAD

BACKGROUND OF THE INVENTION AND PRIOR ART

The invention relates to a method of protecting the electric drive of a vehicle, in particular an electric automobile, against overload when the nominal (i.e. the "rated") power is temporarily exceeded.

An advantage of electric vehicles is that they can be overloaded for short periods or, in other words, their nominal (i.e. "rated") power (maximum permissible contnuous power) can be exceeded for a short period. During the operation of electric vehicles, this advantage is used for starting and accelerating and for driving up slopes and ramps. However, the operation at overload must be limited timewise in order to protect the electric drive from damage.

One overload protection is provided by the thermal monitoring of all of the drive components. When specified temperature thresholds are exceeded, the power of the drive is automatically reduced. The reduction in power leads to a reduction in the traveling speed. The speed reduction occurs as a surprise to the vehicle operator, which can lead to dangerous traffic situations.

Another possiblity for overload protection is to monitor operating current integrated over time. As an example, a circuit configuration is known from German Patent DE-PS 24 31 540 for protecting an electrical machine against excessive heating. In that configuration, the rotor temperature is influenced by limiting the motor current in such a way that the maximum permissible temperature is not exceeded. For this purpose, the square of the measured current is integrated and the integral value is compared with a temperature value corresponding to the nominal power. The motor current is reduced in the case of excessive integral values. If this control is used for electric vehicles, surprising effects can again occur for the vehicle operator because the maximum speed of the vehicle depends on the previous history of the driving power. It is not possible to select a predictable and reproducible driving power (maximum speed).

It is accordingly an object of the invention to provide a method of protecting the electric drive of a vehicle against overload, which overcomes the hereinafore-mentioned disadvantages of the heretofore-known methods of this general type, which makes it possible to keep within driving powers which can be reproduced and which avoids the occurrence of surprising events for the vehicle operator.

SUMMARY OF THE INVENTION

With the foregoing and other objects in view there is provided, in accordance with the invention, a method for protecting the electric drive of a vehicle, especially an electric automobile, against overload when the nominal (i.e. the "rated") power is temporarily exceeded, which comprises measuring the traveling speed of the vehicle, and automatically limiting the traveling speed to prevent the exceeding, at least for a short period of a continuous speed obtained at nominal operation of the electric drive corresponding to traveling resistances independent of acceleration, The method is implemented as soon as the nominal (i.e. the "rated") power of the nominal current of the electric drive is exceeded. Short-term power exceeding the nominal power is then made available for acceleration only.

The nominal power of the electric drive, which includes the components from the energy source used for driving the vehicle wheels, is equal to the maximum permissible continuous power of the drive. This continuous power corresponds to a maximum permissible continuous speed of the vehicle which occurs with the given resistances to travel that are independent of acceleration. The rolling resistance, the slope resistance, the aerodynamic drag and the curve resistance can, for example, be considered as traveling resistances which are independent of acceleration.

The method according to the invention provides reproducible driving performance because the maximum permissible continuous speed is based on the power of the nominal operation and not on the maximum power of the drive. Unexpected events caused by a sudden reduction in power and speed initiated by overload protection can be avoided.

In accordance with another mode of the invention, there is provided a method which comprises determining a maximum permissible continuous speed from current traveling resistances and from the nominal power of the electric drive, comparing the continuous speed with the currently existing vehicle speed, and reducing the drive power (or the drive current) to the nominal power (or nominal current) whenever the vehicle speed is equal to or greater than the maximum permissible continuous speed.

The nominal value of the power or current can be exceeded for a short period during acceleration and until the continuous speed corresponding to the nominal operation of the drive is reached. No acceleration can then occur beyond this continuous speed.

In order to determine the maximum continuous speed, the measured values which are used are preferably those which can be determined directly within the vehicle. These are, for example, the drive current, the drive voltage, the rotational speed of the electrical motor and the speed of the vehicle. The determination of the continuous speed can take place by means of Equation (12) given below.

In accordance with afurther mode of the invention, there is provided a method which comprises limiting the vehicle power whenever the difference between the electrical power to be provided under given operating conditions and the nominal electrical power of the drive is greater than the acceleration power of the electrical vehicle divided by the efficiency of the electric drive.

In accordance with an added mode of the invention, there is provided a method which comprises limiting or reducing the drive current of the electrical drive to a nominal current in order to limit the vehicle power. According to this method as well, all of the measured data which is necessary can be determined directly within the vehicle. As mentioned above, the efficiency of the electric drive is equal to the quotient of the power at the wheel of the vehicle and the electrical power of the drive.

In accordance with an additional mode of the invention, there is provided a method which comprises limiting the drive power or the drive current with a time constant of a few seconds (such as 10 seconds). This is done in order to avoid a sudden change between the drive current and the nominal current in the case of a power reduction. In this way, an acceleration process is not abruptly interrupted.

In accordance with a concomitant mode of the invention, there is provide a method which comprises setting in a constant for the efficiency of the electric drive, such as for battery-operated independent road vehicles.

Other features which are considered as characteristic for the invention are set forth in the appended claims.

Although the invention is illustrated and described herein as embodied in a method of protecting the electric drive of a vehicle against overload, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 4 is a block circuit diagram showing a circuit configuration for carrying out the method.

DESCRIPTION OF THE PREFERRED EMBODIMENTS

I. Theoretical Fundamentals

Figure 1:
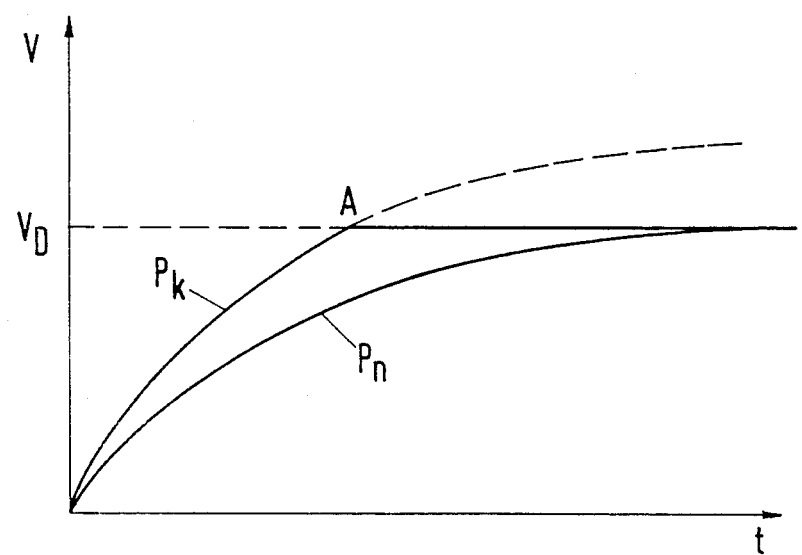
FIG. 1 is a graph showing the variation of speed according to time when a vehicle is accelerated.

The power requirement $P_r$ at the wheel of a vehicle is given by the equation $$(1) \quad P_r = F^* v$$

where:
v = speed; and
F = resistance to travel.

The resistance to travel F is obtained by adding
$F_r$ = rolling resistance;
$F_{st}$ = slope resistance;
$F_L$ = aerodynamic drag;
$F_b$ = acceleration resistance; and
$F_c$ = curve resistance, which is neglected in the following.

$$(2) \quad P_r = (F_r + F_{st} + F_L F_b)^* v$$

The individual resistances can be determined from the following equations:

$$(3) \quad F_r = m^* g^* f_r$$

where:
m = vehicle mass (kg);
g = 9.81 m/sec$^2$; and
$f_r$ = frictional resistance.

$$(4) \quad F_{st} = m^* g^* \sin Alpha.$$

Alpha is the slope angle $$(5) \quad F_l = 0.5^* d^* c_w^* A^* (v \pm v_w)^2$$

where:
d = density of the air = 1.25 kg/m$^3$;
$c_w$ = aerodynamic drag coefficient;
A = vehicle area; and
$v_w$ = wind speed.

If the constants are combined into k, Equation (5) becomes:

$$(6) \quad FL = k^* (v \pm v_w)^2$$

the acceleration resistance $F_b$ is composed of a translatory part and a rotational part. The rotational part is made up of the sum of the moments of inertia referred to the wheel (multiplication by the square of the gear ratios) multiplied by the acceleration b. The rotational proportion is taken into account in the form of a mass factor c. The acceleration resistance is therefore given by the equation:

$$(7) \quad F_b = m^* (1 + c)^* b$$

The transmission ratio $uml_i$ is obtained from the measurement of the speed v (km/h), the motor speed n (r.p.m.) and the tire radius r (m).

$$(8) \quad uml_i = 0.3777^* r^* n / v$$

If the drive includes a speed change gearbox, the different transmission rations $uml_i$ can be associated with known mass factors $c_i$, such that:

$uml_1 \rightarrow c_1$
$uml_2 \rightarrow c_2$
$uml_3 \rightarrow c_3$ etc.

The acceleration b can be determined from the change in speed per unit time ($V_2, V_1, t$).

$$(9) \quad b = (v_2 - v_1)/t$$

The acceleration resistance $F_b$ is calculated from Equations (7) to (9).

Given the above equations, the power requirement $P_r$ at the wheel of a vehicle can, in principle, be determined from the constants (m, g, $f_r$, k, r, $c_j$) and measured values (v, n, alpha, $v_w$). However, the slope alpha and the angular velocity are not immediately available from a measurement made at the vehicle. Nevertheless, both the parameters can be combined as a first approximation in order to gibe the value of an apparent slope angle alpha because head wind and rear wind act like an upward or a downwards slop, when conisdered from within the vehicle.

The power $P_r$ at the wheels is obtained from the measurement of the drive voltage U and the drive current I as:

$$(10) \quad U^* I^* ETA = P_r$$

ETA is the total efficiency of the electric drive from the electrical power supply to the wheel. For any drive, ETA is fundamentally known and can be specified by means of a characteristic field, as a function of power, rotational speed and transmission ratio.

The slope angle alpha is given from Equations (2), (4) and (10) as:

$$\sin alpha = \qquad (11)$$

-continued $$(U * I * ETA - (F_r + F_b) * v - k * v^3)/m * g * v$$

Since this Equation (11) contains only constants of known magnitude and measured quantities (I, U, v, n), which can be directly determined within the vehicle, the slope angle alpha can be determined at any time from within the vehicle.

II. Calculation of the Maximum Permissible Continuous Speed

The maximum permissible continuous speed $v_D$ of the vehicle occurs as a constant speed with the resistances to travel currently present when the electric drive is operated at its nominal power $P_n$ and no accelerating or retarding forces act on the vehicle. The nominal power $P_n$ occuring at the wheel is then given from Equations (2) to (6) as follows:

$$P_n = \qquad (12)$$
$$I_n * U_n * ETA = (f_r + \sin Alpha) * m * g * v_D + k * v_D^3$$

wherein:
$I_n$ = nominal current; and
$U_n$ = nominal voltage.

The continuous speed $v_D$ can be determined by solving Equation (12). An iteration method can be used, for example, in order to solve Equation (12).

III. Limiting the Vehicle Speed to $v_D$

As long as the electrical power of the drive is less than the nominal power $P_n$, the electric drive will not be overloaded and there is no need for an overload protection method to come into play. However, during acceleration of the vehicle it is often desirable to increase the electrical power above the nominal power in order to achieve an increased acceleration effect. The increased power $P_k$ leads to an increased load on the electric drive which is not permissible in the long term. It can therefore only be permitted for a short period.

In accordance with the invention, it is limited by preventing an increase in speed above the continuous speed $v_D$, which has been defined above.

Referring now to the figures of the drawings in detail and first, particularly, to FIG. 1 thereof, there is seen a more detailed explanation by showing, on one hand, the timewise variation of the speed during acceleration at the nominal power $P_n$ and, on the other hand, at an overload power $P_k$ permitted for a short period. At the nominal power $P_n$, the vehicle is accelerated up to the continuous speed $v_D$ (according to the definition). At the overload power $P_k$, the vehicle is more strongly accelerated. however, the acceleration process is interrupted at a time A in order to avoid overloading the drive. The drive is controlled down to nominal operation and the vehicle continues to travel at its continuous speed $v_D$. Two methods are described for this below, using FIGS. 2 and 3.

Figure 2:
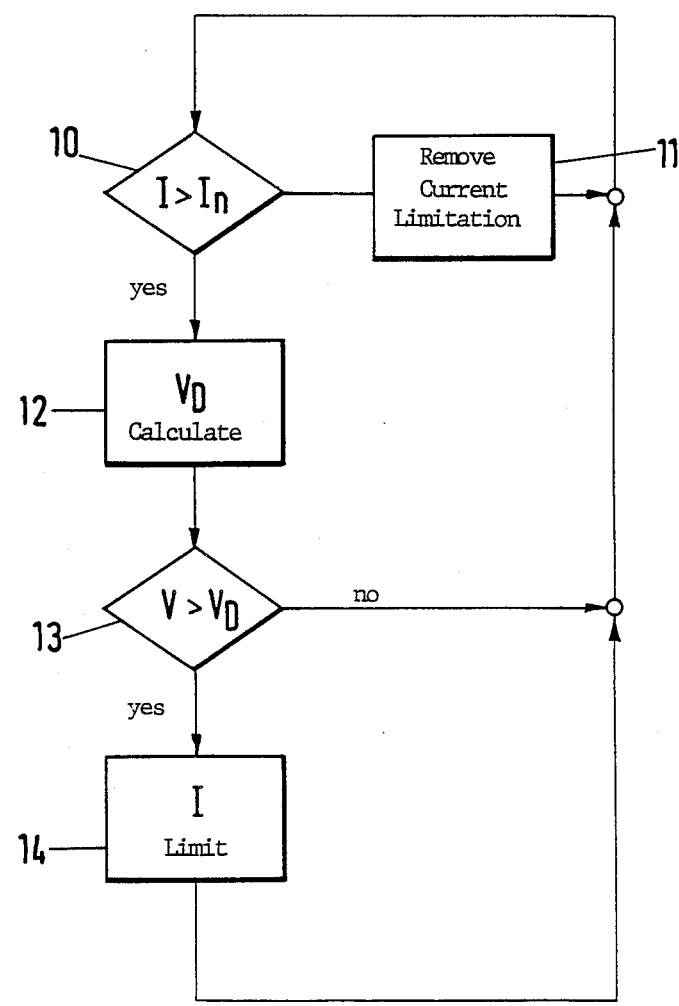
FIG. 2 is a flow chart showing the method in accordance with one embodiment of the invention.

IV. Embodiments of Method According to the Invention (a) As shown in FIG. 2, an interrogation 10 determines whether or not the current I of the electric drive is greater than the nominal current $I_n$. If this is not the case, there is no overload and a possible current limitation is eliminated in a step 11. The current interrogation 10 can then be repeated at specified intervals. If the measured drive current I is greater than the nominal current $I_n$, the continuous speed $v_D$ is calculated in a step 12 using Equation (12). The calculation can take place by means of an appropriate electrical circuit or by means of a computer. A further interrogation 13 then determines whether the traveling speed v of the vehicle is greater than the calculated continuous speed $v_D$. If this is not the case, the interrogation cycle is repeated. If the traveling speed v is greater than the continuous speed $v_D$, a limitation of the drive current I to the nominal current In is undertaken in a step 14. The interrogation cycle is then repeated. Advantageously, the current limitation in step 14 does not take place abruptly but is instead subject to a time constant of, for example, 10 seconds. This avoids an acceleration procedure being abruptly interrupted as soon as the continuous speed $v_D$ is reached.

(b) The direct calculation of the traveling resistance and the continuous speed $v_D$ can be avoided by the use of the method which is described below by means of FIG. 3. This method is based on the consideration that when the drive power P is greater than the nominal power $P_n$, the proportion of the power of the electric drive in excess of the nominal power is smaller than the acceleration power $P_b$ of the vehicle. If the vehicle speed v is greater than the continuous speed $v_D$ defined above, this condition is no longer satisfied so that current limitation down to the nominal current In is undertaken.

These relationships can be derived from Equations (11) and (12). Using the condition that $v_D$ is greater than v gives the relationship:

$$(13) \quad P_n < U*I*ETA - m*(1+c_i)*b*v$$

If the definitions $$P_{e1D} * ETA = P_n \;(P_{e1D} = \text{continuous electrical power}) \qquad (14)$$

$$U * 1 * ETA = P \qquad (15)$$

$$m * (i + c_i) * b * v = P_b \qquad (16)$$

are used, it follows that:

$$(17) \quad U*I - P_{e1D} > P_b/ETA \text{ or } P - P_n > P_b$$

Figure 3:
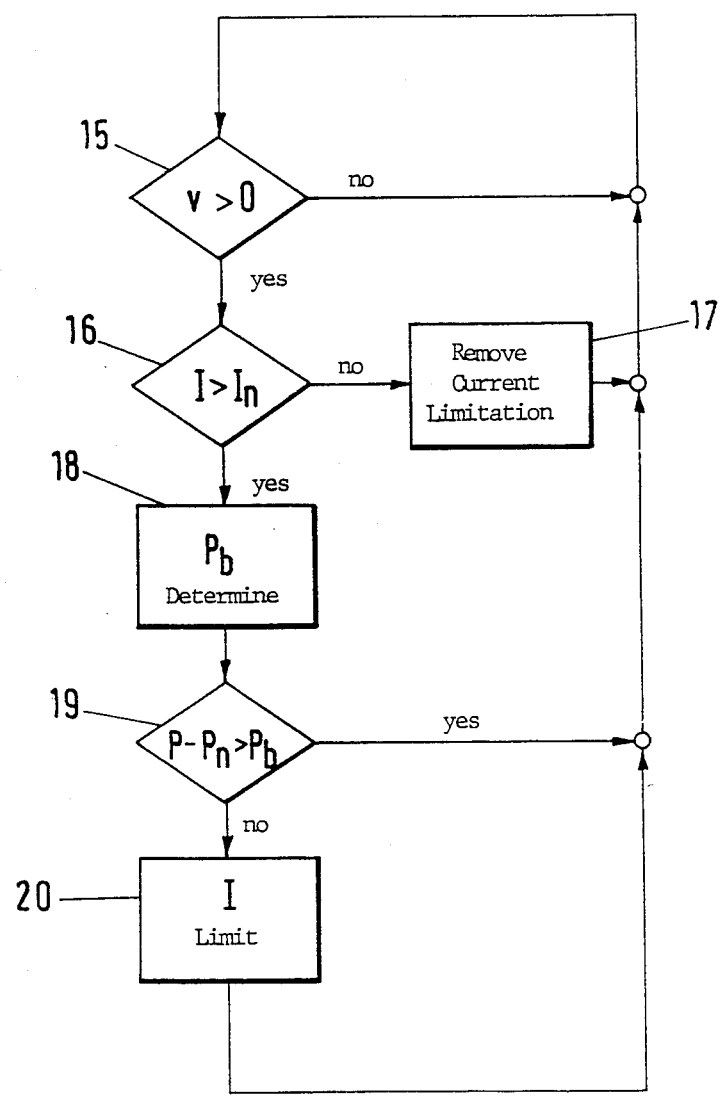
FIG. 3 is a flow chart showing the method in accordance with another embodiment of the invention.

From FIG. 3, it is seen that an interrogation 15 first checks whether or not the vehicle is traveling. If this is the case, an interrogation 16 determines whether or not the current I of the electric drive is greater than the nominal current $I_n$. If this is not the case, the vehicle is not being driven with overload an and a possible current limitation possibly present is eliminated in a step 17. If the measured current I is greater than the nominal current $I_n$, the acceleration power $P_b$ is determined in a step 18 in accordance with Equation (16), using the derivative of the traveling speed v with respect to time (by differentiation). An interrogation 19 then follows in accordance with Equation (17). If Equation (17) is satisfied, the interrogation cycle is repeated. Otherwise, the current I of the electric drive is limited to the nominal current $I_n$ by a step 20. In this case as well, it is desirable to undertake the current limitation gradually (with a time constant).

The method operates independently of all disturbing influences which are located outside the vehicle and can only be determined by calculation (wind speed, slope, curve travel, road surface) because these are obtained by differentiation in accordance with Equation (17). Parameters which are normally measured in the vehicle provide information.

Assuming that the continuous power is also available in the case of a thermal load limitation, a speed, once attained, can always be maintained. Unexpected effects can therefore be avoided.

FIG. 4 shows a circuit configuration by means of which the step 18 and the interrogation 19 of FIG. 3 can be effected.

The measured values of the motor speed n and the vehicle speed v are used by an operator 22 to determine the transmission ration Uml by eans of Equation (8) and the associated mass factor $c_i$ determined. The number 1 is added to the mass factor $c_i$ in an adder 23.

The acceleration b is formed from the measured speed value v in a differentiator 24 and the acceleration b is multiplied by the vehicle mass m in a multiplier 25. The result from the multiplier 25 is multiplied by the result from the adder 23 in a multiplier 26 disposed downstream. The output signal of the multiplier 26 is divided by the efficiency ETA of the electric drive in a divider element 27. The result is multiplied by the measured speed value v in a further multiplier 28. This gives a signal which is equal to the acceleration power $P_b$ divided by the efficiency ETA.

The interrogation 19 is effected by a multiplier 29, an addition element 30 and a threshold element 31. The product of the measured values of the drive current I and the drive voltage U is formed in the multiplier 29. The quotient of the acceleration power $P_b$ and the efficiency ETA which has already been obtained, is subtracted from this product value in the addition or summation element 30. The difference value is supplied to the threshold element 31 where it is compared with the specified value of the maximum permissible electrical continuous power $P_{e1D}$ of the electric drive. If the difference value is greater than $P_{e1D}$, a current limitation is unnecessary. This information is transmitted through the output A for further processing.

The foregoing is a description corresponding in substance to German Application P 36 38 946.3, dated November 14, 1986, the International priority of which is being claimed for the instant application, and which is hereby made part of this application. Any material descrepancies between the foregoing specification and the aforementioned corresponding German application are to be resolved in favor of the latter.

We claim:

1. Method for protecting an electric drive of a vehicle having a given rated power, and being coupled to at least one wheel of the vehicle, and connected to a source of electric drive power, against overload when the rated power is temporarily exceeded, which comprises the steps of: measuring continuously the traveling speed of the vehicle, and automatically limiting the traveling speed to prevent exceeding a continuous speed, computed on the basis of the rated power of the electric drive, adjusted for traveling resistances independent of acceleration.

2. Method according to calim 1, further comprises the steps of: computing a maximum permissible continuous speed from current traveling resistances at a current vehicle speed and from the rated power of the electric drive, comparing the continuous speed with the current vehicle speed, and reducing the electric drive power to the rated power whenever the current vehicle speed is equal to or greater than the computed maximum permissible continuous speed.

3. Method according to claim 2, further comprises the step of limiting the drive current of the electric drive to a rated current in order to limit the electric drive power.

4. Method according to claim 2, further comprises the step of gradually limiting the drive power at a time constant of a few seconds.

5. Method for protecting an electric drive of a vehicle having a given rated power, and being coupled to at least one wheel of the vehicle, and connected to a source of electric drive power, against overload when the rated power is temporarily exceeded, which comprises the steps of: measuring continuously the traveling speed of the vehicle, automatically limiting the traveling speed to prevent exceeding a continuous speed, computed on the basis of the rated power of the electric drive, adjusted for traveling resistances independent of acceleration, limiting the electric drive power whenever the difference between said electrical drive power to be provided under given operating conditions and the rated power of the electric drive is greater than an acceleration power of the vehicle divided by the efficiency of the electric drive.

6. Method according to claim 5, further comprises the step of limiting the drive current of the electric drive to a rated current in order to limit the electric drive power.

7. Method according to claim 6, further comprises the step of gradually limiting the drive power at a time constant of a few seconds.

8. Method according to claim 7, further comprises the step of setting the efficiency of the electric drive at a constant value.

9. Method according to claim 6, further comprises the step of setting the efficiency of the electric drive at a constant value.

10. Method according to claim 5, further comprises the step of setting the efficiency of the electric drive at a constant value.

11. Method for protecting an electric drive of a vehicle having a given rated power, and being coupled to at least one wheel of the vehicle, and connected to a source of electric drive power, against overload when the rated power is temporarily exceeded, which comprises the steps of: measuring continuously the traveling speed of the vehicle, automatically limiting the traveling speed to prevent exceeding a continuous speed, computed on the basis of the rated power of the electric drive, adjusted for traveling resistances independent of acceleration, computing a maximum permissible continuous speed from current traveling resistances at a current vehicle speed and from the rated power of the electric drive, comparing the continuous speed with the current vehicle speed, and reducing the electric drive power to the rated power whenever the current vehicle speed is equal to or greater than the computed maximum permissible continuous speed, limiting the drive current of the electric drive to a rated current in order to limit the vehicle power, and setting the efficiency of the electric drive at a constant value.

* * * * *